US006833336B2

(12) United States Patent
Panandiker et al.

(10) Patent No.: US 6,833,336 B2
(45) Date of Patent: Dec. 21, 2004

(54) LAUNDERING AID FOR PREVENTING DYE TRANSFER

(75) Inventors: Rajan Keshav Panandiker, West Chester, OH (US); Yousef Georges Aouad, Cincinnati, OH (US); Sherri Lynn Randall, Hamilton, OH (US); William Conrad Wertz, West Harrison, IN (US)

(73) Assignee: The Procter & Gamble Company, Cincinnati, OH (US)

( * ) Notice: Subject to any disclaimer, the term of this patent is extended or adjusted under 35 U.S.C. 154(b) by 203 days.

(21) Appl. No.: 09/973,445

(22) Filed: Oct. 9, 2001

(65) Prior Publication Data

US 2003/0158075 A1 Aug. 21, 2003

Related U.S. Application Data

(60) Provisional application No. 60/240,320, filed on Oct. 13, 2000.

(51) Int. Cl.[7] .............................. B32B 9/00; C11D 7/32

(52) U.S. Cl. ....................... 442/121; 510/295; 510/500; 442/164

(58) Field of Search ................................ 510/499, 295, 510/500; 442/121, 164, 170

(56) References Cited

U.S. PATENT DOCUMENTS

| | | | | | |
|---|---|---|---|---|---|
| 3,414,459 | A | | 12/1968 | Wells | |
| 3,694,364 | A | | 9/1972 | Edwards | |
| 3,816,321 | A | | 6/1974 | Kleinschmidt | |
| 3,853,758 | A | | 12/1974 | Hurwitz et al. | |
| 3,905,863 | A | | 9/1975 | Ayers | |
| 3,929,135 | A | | 12/1975 | Thompson | |
| 3,944,694 | A | | 3/1976 | McQueary | |
| 3,956,556 | A | | 5/1976 | McQueary | |
| 3,974,025 | A | | 8/1976 | Ayers | |
| 4,007,300 | A | | 2/1977 | McQueary | |
| 4,012,540 | A | | 3/1977 | McQueary | |
| 4,065,257 | A | | 12/1977 | Coe et al. | |
| 4,118,525 | A | * | 10/1978 | Jones | 427/242 |
| 4,191,609 | A | | 3/1980 | Trokhan | |
| 4,254,139 | A | | 3/1981 | Hendrickson et al. | |
| 4,273,878 | A | | 6/1981 | Amick | |
| 4,324,246 | A | | 4/1982 | Mullane et al. | |
| 4,342,314 | A | | 8/1982 | Radel et al. | |
| 4,380,453 | A | | 4/1983 | Claiborne | |
| 4,463,045 | A | | 7/1984 | Ahr et al. | |
| 4,494,264 | A | | 1/1985 | Wattiez et al. | |
| 4,780,352 | A | | 10/1988 | Palumbo | |
| 5,006,394 | A | | 4/1991 | Baird | |
| 5,451,337 | A | | 9/1995 | Liu et al. | |
| 5,474,576 | A | | 12/1995 | Thoen et al. | |
| 5,478,489 | A | | 12/1995 | Fredj et al. | |
| 5,520,875 | A | | 5/1996 | Wnuk et al. | |
| 5,534,182 | A | | 7/1996 | Kirk et al. | |
| 5,627,151 | A | | 5/1997 | Detering et al. | |
| 5,698,476 | A | | 12/1997 | Johnson et al. | |
| 5,881,412 | A | | 3/1999 | Ziskind | |
| 6,008,316 | A | | 12/1999 | Foster, Jr. et al. | |
| 6,140,293 | A | * | 10/2000 | Lappas | 510/305 |
| 6,277,810 | B2 | * | 8/2001 | Baines et al. | 510/475 |
| 6,410,496 | B1 | * | 6/2002 | Masschelein et al. | 510/277 |

FOREIGN PATENT DOCUMENTS

| | | |
|---|---|---|
| EP | 0 325 944 A1 | 1/1989 |
| EP | 0 341 205 A2 | 11/1989 |
| EP | 0 634 486 A1 | 1/1995 |
| EP | 0 753 566 A2 | 1/1997 |
| EP | 0 779 358 A2 | 6/1997 |
| EP | 1 020 513 A2 | 7/2000 |
| JP | 07024951 | 7/1993 |
| WO | WO 95/03765 | 2/1995 |
| WO | WO 96/00548 | 1/1996 |
| WO | WO 97/42286 | 11/1997 |
| WO | WO 97/42290 | 11/1997 |
| WO | WO 98/49259 | 11/1998 |
| WO | WO 99/15614 | 4/1999 |
| WO | WO 00/35880 | 6/2000 |

OTHER PUBLICATIONS

Kirk–Othmer's Encyclopedia of Chemical Technology; vol. 14; pp. 737–783; 1995.

* cited by examiner

*Primary Examiner*—Gregory R. Del Cotto
(74) *Attorney, Agent, or Firm*—Marianne Dressman; Julia A. Glazer; Brahm J. Corstanje

(57) ABSTRACT

A laundry additive article comprising an insoluble polymeric amine dye absorber physically adhered to an insoluble substrate is disclosed. The insoluble polymeric amine dye absorber is dye-selective, preferentially binding fugitive dyes in a wash solution, rather than detergent components or fabrics. The laundry additive article may comprise additional components including a dye transfer inhibitor and a signal to visually indicate that fugitive dyes have been scavenged.

4 Claims, No Drawings

LAUNDERING AID FOR PREVENTING DYE TRANSFER

CROSS REFERENCE TO RELATED APPLICATIONS

This application claims priority under 35 U.S.C. § 119(e) to U.S. Provisional Application Ser. No. 60/240,320, filed Oct. 13, 2000 (Attorney Docket No. 8297P).

FIELD OF THE INVENTION

The present invention relates to a laundry additive article that provides effective dye absorbing and dye transfer inhibiting benefit. More specifically, the invention uses a substantially insoluble cross-linked polymeric amine fixed to an insoluble substrate to selectively remove extraneous dyes from a wash solution before redeposition onto other articles and/or garments can occur. The dye absorber is also dye-selective to prevent interference with detergents or other additives.

BACKGROUND OF THE INVENTION

One problem that has persistently troubled the fabric care industry has been the problem of dyes bleeding from colored articles and/or garments in the washing machine and then redepositing on lighter-colored articles and/or garments in the same wash load. Several attempts have been made to try to remedy this problem of "fugitive dyes," but to date none has been completely successful. Typically laundry is hand sorted into like-colored groups before washing. While this method often provides satisfactory results, it is time-consuming, inconvenient, and prone to oversights. A single oversight when sorting laundry can ruin a whole wash load of lighter colored articles and/or garments.

Several methods have been developed to address this problem of unwanted dye transfer, though none have solved the problem satisfactorily. Methods designed to increase the affinity of fabrics for dyes have not been able to resolve the problem of the fabric releasing the dyes in the washing solution. Another approach has been to bleach the dyes that are released into the washing solution before they have a chance to transfer to other articles and/or garments (U.S. Pat. Nos. 5,451,337, 5,474,576). The use of bleaching agents has the undesirable effect of bleaching not only the fugitive dyes, but also bleaching the dyes still attached to the articles and/or garments, resulting in fading or color change of the dyed articles and/or garments. The oxidizing agents can also interfere with laundry detergent components, making the detergents less effective.

Polymers have been used as dye transfer inhibitors (U.S. Pat. Nos. 5,698,476, 5,534,182, 5,478,489, 4,065,257) and as dye absorbers (U.S. Pat. Nos. 5,698,476, 3,816,321, 3,694,364, EP Pat. Appl. 0 341 205), again with unsatisfactory results. Polymers chosen as dye transfer inhibitors thus far have been cationic, to facilitate interaction with dyes which are known to those skilled in the art to be anionic. Cationic polymers have been used as laundry additives in both soluble and insoluble forms. The cationic polymers do bind with the anionic dyes, but they are non-selective and bind to other anionic compounds in the wash solution, such as anionic surfactants which are present at much higher concentrations than fugitive dyes, decreasing the efficiency of the dye inhibitor and the detergent's cleaning power. They also tend to bind the optical brighteners, another anionic component of laundry detergents. Binding the optical brighteners makes the laundered clothes appear less bright and clean and the consumer perceives the detergent as being less effective. Furthermore, and perhaps most significant, the soluble cationic polymers tend to bind to articles of clothing in the wash solution, then act as dye absorbers, absorbing and then permanently fixing the fugitive dyes to the articles and/or garments.

Recently, the above methods have been combined to try to circumvent problems inherent in the individual methods, again with only limited success. One method discloses the combination of a dye transfer inhibiting water-soluble cationic polymer, which absorbs fugitive dyes, and an oxidizing agent (U.S. Pat. No. 5,478,489). The problem still remaining is that some cationic polymer is attracted to articles and/or garments, adsorbs to the articles and/or garments and then absorbs and fixes unwanted fugitive dyes to those articles and/or garments. Other recent inventions have used cationic polymers bound to substrates to take up fugitive dyes. By incorporating the cationic polymers into a substrate, the binding of these polymers to the articles and/or garments and subsequent transfer of dye to the garment is intended to be eliminated. However, the cationic polymers are never completely insoluble, so the problem persists.

U.S. Pat. No. 5,698,476 discloses a system which uses a cationic polymer dye absorber bound to a substrate in combination with a soluble dye transfer inhibitor. The expectation was that since both the cationic dye absorber and the dye transfer inhibitor capture some portion of the fugitive dye the adsorption of fugitive dyes onto other articles and/or garments would be eliminated. Unfortunately, this method, too, has been found unsatisfactory. Using this dual method the dyes are scavenged from the laundering solution, but again, the cationic polymers cannot be made completely insoluble; they are, in fact, up to 20% soluble. The result is that there is always some soluble cationic material that then adsorbs to articles and/or garments, absorbing and fixing fugitive dyes to those articles and/or garments.

Accordingly, the need remains for an laundry aid which can bind fugitive dyes and effectively keep the bound dyes from redepositing onto other articles and/or garments; provide a signal for the consumer to know that the fugitive dyes have been bound; and not interfere with detergents, surfactants, or optical brighteners, change the color of dyed fabrics, or increase the release of dyes from fabrics.

SUMMARY OF THE INVENTION

The present invention solves the aforementioned problems by providing a laundry additive article that effectively and selectively absorbs extraneous dyes in a wash solution and prevents redeposition onto other articles and/or garments. The invention incorporates an insoluble dye-selective absorber, and optionally, a dye transfer inhibitor. The article is simply added to a washing machine with the articles and/or garments and allowed to circulate freely during the wash. It selectively removes extraneous dyes in solution without interfering with the cleaning and brightening power of the detergent. The article can also safely be placed in a clothes dryer with the articles and/or garments.

The dye absorber is a substantially insoluble cross-linked polymeric amine, selected from existing polymers, polymeric amines formed by copolymerization, polymeric amines formed by cross-linking soluble polyamines, or polymeric amines formed by reacting poly amines with cross-linking agents. It can be grafted onto the substrate by any suitable grafting technique, including but not limited to chemical, thermal, and ultraviolet grafting techniques. When dyes are bound by the dye absorber, a color change may signal to the consumer that extraneous dyes have been scavenged from the wash solution and redeposition onto articles and/or garments has been prevented.

It is therefore an object of the invention to provide a laundry additive article that effectively and selectively absorbs extraneous dyes in a wash solution and prevents redeposition of those dyes on other articles and/or garments in the same wash solution. It is a further object to achieve absorption of extraneous dyes in a wash solution without interfering with the detergent's cleaning and brightening power.

DETAILED DESCRIPTION OF THE INVENTION

The laundry additive article of the present invention comprises a substantially insoluble polyamine dye absorber fixably adhered to an insoluble substrate. Optionally, the article may additionally contain a dye transfer inhibitor, a visual signal designed to indicate that the article has removed extraneous dyes from the wash solution, as well as a variety of other adjuncts.

By substantially insoluble it is meant that the dye absorber has a solubility in water that is less than or equal to about 20 percent by weight. By extraneous dyes or fugitive dyes it is meant the dyes that bleed from fabrics in an aqueous wash solution. When referring to fabric, it is meant to encompass any clothes, towels, linens, and any other articles that are commonly washed in a household or commercial washing machine.

A key feature of the present invention is the ability of the laundry additive article to selectively absorb dyes from solution without interfering with the detergent components. The gain in selectivity over other dye absorbers is due to the use of insoluble polyamine dye absorbers rather than conventional quaternary ammonium dye absorbers. Preferably the dye absorbers have aromatic moieties; the present invention takes advantage of the interactions between the aromatic moieties, the dye and the polymer, to produce a dye-selective article. Because the dye absorber is an amine rather than quaternary ammonium compound, anionic surfactants are not attracted to the dye absorber, improving the efficiency of the dye absorber without impairing the effectiveness of the detergent.

The second key feature of the present invention is that, unlike conventional quaternary ammonium dye absorbers, any of the amine dye absorber that solubilizes in the wash solution will not adsorb to fabrics. This is especially important because in an industrial process polymeric dye absorbers, whether neutral or cationic, cannot be made completely insoluble; there is always a small amount of the dye absorbing material that will solubilize into the wash solution. Solubilized cationic dye absorbers are attracted to sites on fabrics. They adsorb to the fabrics and absorb fugitive dyes, irreversibly fixing them to the fabric. Any solubilized dye absorber of the present invention actually acts as a dye transfer inhibitor; rather than adsorbing to fabrics, they remain in the wash solution, absorb fugitive dyes, and are rinsed away.

The Dye Absorber

The central feature of the current invention is an efficient dye-selective dye absorber. By dye-selective, it is meant that the dye absorber binds fugitive dyes preferentially over other agents present in a wash solution, such as detergent components and fabrics. The dye selectivity is due to the nature of the dye binding process. Traditionally, dye absorbers have been quaternary ammonium compounds, chosen to interact with the anionic dyes used on fabrics. However, anionic surfactants, which are major components of laundry detergents, are present in the wash solution in much greater concentrations than fugitive dyes. The result is that quaternary ammonium dye absorbers bind much more surfactant than dye, decreasing the efficiency of both the dye absorber and the detergent.

It has been discovered that by relying on interactions other than anionic-cationic, effective and selective dye absorbers may be produced. Some interactions that may be used advantageously include, but are not limited to, aromatic-aromatic interactions, charge interactions, hydrogen bonding, absorbing, adsorbing, complexing, or otherwise tying up fugitive dye molecules. The most preferable method according to this invention is an aromatic-aromatic interaction. In addition to being anionic, dyes used on fabrics are aromatic in nature. By using a dye absorber that also contains aromatic functionalities, the dye and dye absorber can interact strongly enough to remove fugitive dyes from the wash solution and hold them in the insoluble dye absorber polymer matrix, preventing them from redepositing on other fabrics in the wash solution. One added benefit is that the aromatic dye absorber does not bind the surfactants present in the detergent, so detergent efficiency is not affected. Furthermore, since the dye absorber does not get bound up with non-dye agents, it is more effective than conventional cationic dye absorbers. A second benefit is that any small amount of dye absorber that is solubilized in the wash solution does not bind to clothes, instead, it acts as a dye transfer inhibitor, advantageously keeping dyes from redepositing on fabrics in the wash solution.

In accordance with the substantially insoluble nature of the dye absorber, the maximum solubility is less than about 20% by weight. Preferably, less than about 5% of the dye absorber will be soluble in an aqueous wash solution.

The amount of dye absorber used in the laundry additive article falls within the range of about 0.1 to 5 g per article. As these laundry additive articles are intended to be single use, an effective amount of dye absorber per wash load is 0.1 to 5 g. The preferred amount is 1 g of dye absorber per article. It should be understood and recognized by one of skill in the art that the amount of dye absorber can be adjusted based on the size of the wash load or the size of the substrate and still be within the spirit of the invention.

The dye absorber can be coated on the insoluble substrate by any conventional method known to those of ordinary skill in the art, including, but not limited to, dip coating, whereby both sides of the substrate are coated; and coating one side of the substrate and subsequently using a vacuum to pull coating through the web of the substrate, allowing the dye absorber to be coated onto one or both sides of the substrate.

The polymeric amine dye absorbers are made substantially insoluble through cross-linking. The polymers may be cross-linked prior to introduction to the web and subsequently adhered to the web; cross-linked simultaneously with their introduction to the web; or cross-linked after introduction to the web.

In a preferred method, polymerization and cross-linking are done directly on the web. The polymer and cross-linking agent may be mixed directly in a tank just prior to coating, may be mixed as they are introduced to the web, or mixed in-line, as the web is being coated. In another method, one component may be on the web prior to coating, as the web is coated suction is applied and cross-linking takes place. These methods allow the polymer to form an insoluble network around the substrate's web, fixing the polymer to the substrate without the need to chemically modify the substrate beforehand.

Polymers that have been cross-linked prior to their introduction to the web may be used effectively as selective dye absorbers in the present invention. They may be grafted to the substrate using any of several techniques known to those of ordinary skill in the art, including, but not limited to, chemical, thermal, ultraviolet, or other suitable grafting techniques. Some polymers cross-linked prior to their introduction to the substrate that are especially useful include cross-linked homopolymers, copolymers, and terpolymers of polyvinyl pyrrolidone; cross-linked homopolymers, copolymers, and terpolymers of polyvinyl pyridine and its derivatives especially quaternized polyvinyl pyridine carboxylate polymers described in WO 00/35880, cross-linked homopolymers, copolymers, and terpolymers of polyvinyl-N-oxide; cross-linked homopolymers, copolymers, and terpolymers of polyallylamine; homopolymers, copolymers, and terpolymers containing the monomer unit

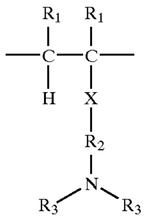

and the monomer units from other suitable copolymerizable monoethylenically unsaturated monomers, wherein:

$R_1$ is selected from H, $C_1$–$C_4$ alkyl and mixtures thereof; preferably $R_1$ is selected from H, methyl and mixtures thereof;

$R_2$ is selected from $C_2$–$C_6$ alkylene, hydroxyalkylene, and mixtures thereof;

$R_3$ is selected from H, $C_1$–$C_4$ alkyl, $C_7$–$C_9$ alkylaryl, $C_2$–$C_4$ hydroxyalkyl, and mixtures thereof; preferably $R_3$ is methyl;

X is selected from the group consisting of

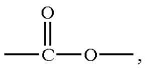 , 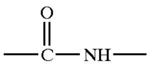

and mixtures thereof;

cross-linked homopolymers, copolymers, and terpolymers containing the monomer unit

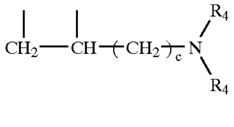

and monomer units produced from other suitable copolymerizable monoethylenically unsaturated monomers, wherein c=0 or 1; and $R_4$ is selected from the group consisting of H, $C_1$–$C_4$ alkyl, hydroxyalkyl, and mixtures thereof.

In addition, cross-linked anion exchange resins made from water insoluble monoethylenically unsaturated monomers such as styrene, butadiene and acrylic esters and, as a crosslinker a small proportion of polyethylenically unsaturated monomers such as divinyl benzene, divinyl naphthalene, diallyl phthalate, may be used as dye absorbers. Anion exchange resins have been described in Charles Dickert in Kirk-Othmer's Encyclopedia of Chemical technology Volume 14 pp 737–783. (1995) John Wiley and Son. Examples of anion exchange resins have also been described in U.S. Pat. No. 3,853,758, GBP 1,335,591 and U.S. Pat. No. 4,273,878.

Specific examples of anion exchange resins are Amberlite® IRA-35, Amberlite® IRA-47, Amberlite® IRA-68, Amberlite® IRA-410, Amberlite®IRA-440C, Amberlite®IRA-458 (commercially available from Rohm and Haas, Philadelphia, Pa.), Dowex® 1X8, Dowex® MSA-1C, Dowex SBR-C (commercially available from Dow Chemicals, Midland Mich.). Preferred anion exchange resins are the Weak Base anion exchange resins with primary, secondary or tertiary amine as the functional groups. Examples of such resins are Amberlite® IRA-35, Amberlite® IRA-47 and Amberlite® IRA-68.

In a preferred method, the substantially insoluble cross-linked polymeric amine is formed by cross-linking during or after the polymerization process. The cross-linked polymeric amine may be formed by copolymerizing monoethylenically unsaturated amine-containing monomers with monomers which have a group capable of forming cross-links. The group capable of forming crosslinks is selected from polyethylenically unsaturated momomers and polyfunctional vinyl and acrylic compounds. Specific monomers capable of forming branches or cross-links and suitable for the present invention include divinyl benzene, divinyl naphthalene, diallyl phthalate, ethylene glycol diacrylate, ethylene glycol dimethacrylate, divinyl sulfone, polyvinyl or polyallyl ethers of glycol, glycerol or pentaerythritol, divinyl ketone, divinyl sulfide, diallyl maleate, diallyl fumarate, diallyl malonate, divinyladipate, diallyl sebacate, diallyl oxalate, triallyl citrate, triallyl aconitate, trivinyl naphthalene, polyvinyl anthracene, N,N'ethylenediacrylamide, N,N'ethylenemethacrylamide, butane-1,4-diacrylate, divinylimidazolidone-2, as well as other similar molecules.

Alternately, the cross-linked polymeric amine may be formed by cross-linking soluble amine-containing molecules by reacting them with reactive cross-linking agents. The appropriate cross-linking agent is chosen with respect to the functional groups on the monomer. Polyamines can be chosen from polymers, oligomers, prepolymers, or mixtures of those, having functional groups such as hydroxyl, amine, ester, ketone or amide, or mixtures thereof.

Crosslinking agents are selected such that they react with the functional group of the polyamine to form a crosslinked polymeric network. Cross-linking agents which are suitable for use in the present invention contain reactive groups such as epihalohydrins, alkylene dihalide, alkylene triahalide epoxide, azetedinium group, glyoxal and isocyanate group.

Examples of crosslinking agents are epihalohydrin, bishalohydrins of diols, bishalohydrins of polyalkylene glycols, bishalohydrins of polytetrahydrofurans, alkylene dihalides, alkylene trihalides, bisepoxides, trisepoxides, tetraepoxides, or mixtures thereof. Particulary preferred are epichlorohydrin, bisphenol A, triglycidyl ethers such as trimethylolpropane triglycidyl ether and glycerolpropoxylate triglycidyl ether.

Another group of crosslinking agents are reactive wet strength resins described by L. L. Chan in Wet Strength Resins and their Application, Tappi Press 1994. Preferred wet strength resins are polyamidoamine-epichlorohydrin resins and polymeric amine-epichlorohydrin resins, (PAE resins). These resins are produced by a polycondensation reaction of a polyalkylenepolyamine with a polycarboxylic acid and then reacting the condensate with epihalohydrin. They can also be produced by condensing polyalkylenepolyamine with a dihalide and subsequent reaction with epichlorohydrin. Examples of PAE resins are Kymene 557H, Kymene 450, Kymene 736, Kymene557LX, all supplied by Hercules Inc., of Wilmington, Del. and Leuresin KNU supplied by BASF, AG Ludwigschaefen, Germany. Another preferred class of crosslinking resins is glyoxalated polymers, preferably glyoxalated polyacrylamide polymers. These polymers can be applied as a solution or as an emulsion polymer or latex. One skilled in the art would also recognize that other suitable cross-linking agents may be used.

The water-soluble polyamines may be formed by reacting condensates of soluble amines with a cross-linking agent. The condensates of soluble amines may be selected from linear alkylamines, branched alkylamines, cycloalkylamines, alkoxyamines, amino acids, cyclic amines containing at least one nitrogen atom in a ring structure, alkenediamines, polyetherdiamines, polyalkylenepolyamines, mixtures of an amine with at least one amino acid, and mixtures thereof. Cross-linking agents may be selected from epihalohydrins, bishalohydrins of diols, bishalohydrins of polyalkylene glycols, bishalohydrins of polytetrahydrofuran, alkylene dihalides, alkylene trihalides, bisepoxides, trisepoxides, tetraepoxides, and mixtures thereof.

Specific examples of suitable consendates include methylamine, ethylamine, n-propylamine, isopropylamine, n-butylamine, isobutylamine, pentylamine, hexylamine, heptylamine, octylamine, 2-ethylhexylamine, isooctylamine, nonylamine, isononylamine, decylamine, undecylamine, dodecyclamine, tridecylamine, stearylamine, palmitylamine, dimethylamine, diethylamine, dipropylamine, dibutylamine, dipentylamine, dihexylamine, bis-(2-ethylhexyl)amine, ditridecylamine, N-methylbutylamine, N-ethylbutylamine, piperidine, morpholine, pyrrolidine, 2-methoxyethylamine, 2-ethoxyethylamine, 3-ethoxypropylamine, 3-ethoxypropylamine, 3-[(2-ethylhexyl)oxy]-1-propaneamine, 3-[(2-methoxyethoxy]-1-propaneamine, 2-methoxy-N-(2-methoxyethyl)ethanamine, 2-aminoethanol, 3-amino-1-propanol, 1-amino-2-propanol, 2-(2-aminoethoxy)ethanol, 2-[(2-aminoethyl)amino] ethanol, 2-(methylamino)ethanol, 2-(ethylamino)ethanol, 2-(butylamino)ethanol, diethanolamine, 3-[(2-hydroxyethyl)amino]1-propanol, diisopropanolamine, bis-(2-hydroxyethyl)aminoethylamine, bis-(2-hydroxypropyl) aminoethylamine, bis-(2-hydroxyethyl)aminopropyl-amine, bis-(2-hydroxypropyl)aminopropylamine, cyclopentylamine, cyclohexylamine, N-methylcyclohexylamine, N-ethylcyclohexylamine, dicyclohexylamine, ethylenediamine, propylenediamine, butylenediamine, neopentyldiamine, hexamethylenediamine, octamethylenediamine, isophoronediamine, 4,4'-methylenebiscyclohexylamine, 4,4'-methylenebis(2-methylcyclohexylamine), 4,7-dioxadecyl-1,10-diamine, 4,9-dioxadodecyl-1,12-diamine, 4,7,10-trioxatridecyl-1,13-diamine, 2-(ethylamino)ethylamine, 3-(methylamino) propylamine, 3-(cyclohexylamino)propylamine, 3-aminopropylamine, 2-(diethylamino)ethylamine, 3-(dimethylamino)propylamine, 3-(diethylamino) propylamine, dipropylenetriamine, tripropylenetetramine, N,N-bis-(aminopropyl)methylamine, N,N-bis-(aminopropyl)ethylamine, N,N-bis-(aminopropyl) hexylamine, N,N-bis-(aminopropyl)octylamine, 1,1-dimethyldipropylenetriamine, N,N-bis-(3-dimethylaminopropyl)amine, N,N'-1,2-ethanediylbis-(1,3-propanediamine), diethylenetriamine, bis-(aminoethyl) ethylenediamine, bis-(aminopropyl)ethylenediamine, bis-(hexamethylene)triamine, N-(aminoethyl) hexamethylenediamine, N-(aminopropyl) hexamethylenediamine, N-(aminopropyl)ethylenediamine, N-(aminoethyl)butylenediamine, N-(aminopropyl) butylenediamine, bis-aminoethyl)hexamethylenediamine, bis-(aminopropyl)hexamethylenediamine, bis-(aminoethyl) butylenediamine, bis-(aminopropyl)butylenediamine, 4-aminomethyloctane-1,8-diamine, and N,N-diethyl-1,4-pentanediamine.

Cyclic amines containing at least one nitrogen atom in a ring structure are for example monoaminoalkylpiperazines, bis(aminoalkyl)piperazines, monoaminoalkylimidazoles, aminoalkylmorpholines, aminoalkylpiperidines and aminoalkylpyrrolidines. The monoaminoalkylpiperazines are, for example, 1-(2-aminoethyl)piperazine and 1-(3-aminopropyl)piperazine. Preferred monoaminoalkylimidazoles have 2 to 8 carbons atoms in the alkyl group. Examples of suitable compounds are 1-(2-aminoethyl)imidazole and 1-(3-aminopropyl)imidazole. Suitable bis(aminoalkyl) piperazines are for example 1,4-bis(2-aminoethyl) piperazine and 1,4-bis(3-aminopropyl)-piperazine. Preferred aminoalkylmorpholines are aminoethylmorpholine and 4-(3-aminopropyl)morpholine. Other preferred compounds of this group are aminoethylpiperidine, aminopropylpiperidine and aminopropylpyrrolidine.

Cyclic amines with at least two reactive nitrogen atoms in the ring are for example imidazole, C-alkyl substituted imidazoles having 1 to 25 carbon atoms in the alkyl group such as 2-methylimidazole, 2-ethylimidazole, 2-propylimidazole, 2-isopropylimidazole and 2-isobutylimidazole, imidazoline, C-alkyl substituted imidazolines having 1 to 25 carbon atoms in the alkyl group and arylimidazolines such as 2-phenylimidazoline and 2-tolylimidazoline, piperazine, N-alkylpiperazines having 1 to 25 carbon atoms in the alkyl group such as 1-ethylpiperazine, 1-(2-hydroxy-1-ethyl)piperazine, 1-(2-hydroxy-1-propyl)piperazine, 1-(2-hydroxy-1-butyl) piperazine, 1-(2-hydroxy-1-pentyl)piperazine, 1-(2,3-dihydroxy-1-propyl)piperazine, 1-(2-hydroxy-3-phenoxyethyl)piperazine, 1-(2-hydroxy-2-phenyl-1-ethyl) piperazine, N,N'-dialkylpiperazines having 1 to 25 carbon atoms in the alkyl group for example 1,4-dimethylpiperazine, 1,4-diethylpiperazine, 1,4-dipropylpiperazine, 1,4-dibenzylpiperazine, 1,4-bis(2-hydroxy-1-ethyl)piperazine, 1,4-bis(2-hydroxy-1-propyl) piperazine, 1,4-bis(2-hydroxy-1-butyl)piperazine, 1,4-bis(2-hydroxy-1-pentyl)piperazine, and 1,4-bis(2-hydroxy-2-phenyl-1-ethyl)piperazine. Other cyclic amines with at least two reactive nitrogen atoms are melamine and benzimidazoles such as 2-hydroxybenzimidazole and 2-aminobenzimidazole. Preferred cyclic amines with at least two reactive nitrogen atoms are imidazole, 2-methylimidazole, 4-methylimidazole and piperazine.

The amine may be selected from the group consisting of (i) at least one cyclic amine containing at least two reactive nitrogen atoms and (ii) mixtures of at least one cyclic amine containing at least two reactive nitrogen atoms with at least one other amine containing 1 to 6 nitrogen atoms. Examples of other amines containing 1 to 6 nitrogen atoms of which at least one is not quaternary are linear alkyl amines having 1 to 22 carbon atoms in the alkyl group, branched alkylamines, cycloalkylamines, alkoxyamines, amino alcohols, cyclic amines containing one nitrogen atom in a ring structure, alkylenediamines, polyetherdiamines, and polyalkylenepolyamines containing 3 to 6 nitrogen atoms.

Preferred amines that are used in mixture with at least one cyclic amine with at least two reactive nitrogen atoms are methylamine, ethylamine, propylamine, ethylenediamine, 1,4-diaminobutane, 1,2-diaminobutane, 1,3-diaminopropane, 1,2-diaminopropane, hexamethylenediamine, bishexamethylenetriamine, diethylenetriamine, dipropylenetriamine, triethylentetramine, tetraethylenepentamine, dimethylaminopropylamine and N,N-bis(3-aminopropyl)-N-methylamine. Most preferred amines that are used in mixture with at least one cyclic amine with at least two reactive nitrogen atoms are ethylenediamine, 1,3-diaminopropane, hexamethylenediamine, dimethylaminopropylamine and N,N-bis(3-aminopropyl)-N-methylamine.

Examples of amino acids which are suitable for use in the dye absorber include glycine, alanine, aspartic acid, glutamic acid, asparagine, glutamine, lysine, arginine, threonine, 2-phenylglycine, 3-aminopropionic acid, 4-aminobutyric acid, 6-aminocaproic acid, 11-aminoundecanoic acid, iminodiacetic acid, sarcosine, 1-carboxymethylpiperazine, 1,4-bis(carboxymethyl) piperazine, 1-carboxymethylimidazole, imidazole carboxylic acid, anthranilic acid, sulfanilic acid, amidosulfonic acid, aminomethylsulfonic acid, aminoethylsulfonic acid, salts thereof, and mixtures thereof.

Other water-soluble polyamines that may be reacted with a suitable cross-linking agent to form the dye absorber include homopolymers, copolymers, and terpolymers of vinyl pyrrolidone; homopolymers, copolymers, and terpolymers of polyvinyl pyridine and its derivatives; homopolymers, copolymers and terpolymers of quaternized polyvinyl pyridine, homopolymers, copolymers and terpolymers of quaternized polyvinyl pyridine carboxylate described in WO 0035880, homopolymers, copolymers, and terpolymers containing the monomer unit

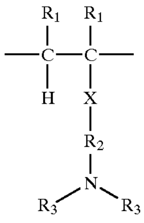

and monomer units from other suitable copolymerizable monoethylenically unsaturated monomers, wherein $R_1$ is selected from the group consisting of H, methyl, and mixtures thereof, $R_2$ is selected from the group consisting of $C_2$–$C_6$ alkylene, hydroxyalkylene, and mixtures thereof, $R_3$ is selected from the group consisting of H, $C_1$–$C_4$ alkyl, $C_7$–$C_9$ alkylaryl, $C_2$–$C_4$ hydroxyalkyl, and mixtures thereof, and X is selected from the group consisting of

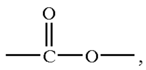 , 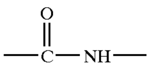

and mixtures thereof. Also suitable are homopolymers, copolymers, and terpolymers comprising the monomer unit

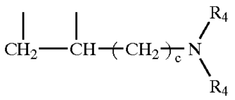

and the monomer units produced from other monoethylenically unsaturated monomers, wherein c is one, and $R_4$ is selected from the group consisting of H $C_1$–$C_4$ alkyl, hydroxyalkyl, and mixtures thereof; as well as mixtures of any of the above amine polymers.

Suitable cross-linking agents that may be used with these polymers include epihalohydrins, bishalohydrins of diols, bishalohydrins of polyalkylene glycols, bishalohydrins of polytetrahydrofurans, alkylene dihalides, alkylene trihalides, bisepoxides, trisepoxides, tetraepoxides, and mixtures thereof.

Preferred polymers are polyvinyl pyrrolidone, copolymer and terpolymers of vinyl pyrrolidone with monomers selected from vinyl imidazole, acrylic acid, methacrylic acid, C1–C16 alkylmethacrylate, C1–C16 alkyl acrylate, C1–C8 hydroxyalkylacrylate, C1–C8 hydroxyalkylmethacrylate, acrylamide, C1–C16 alkyl acrylamide, C1–C16 dialkylacrylamide, 2-acrylamido-2-methylpropane sulfonic acid or its alkali salt, methacrylamide, C1–C16 alkylmethacrylamide, C1–C16 dialkylmethacrylamide, vinyl formamide, vinylacetamide, vinyl alcohol, C1–C8 vinylalkylether, itaconic acid, vinyl acetate, vinyl propionate, vinyl butyrate, vinyl alcohol, vinyl formamide, vinylamine, vinyl caprolactam, styrene and mixtures thereof.

Most preferred polymers are copolymers of polyvinylpyrrolidone and vinyl imidazole sold under the trade name Sokolan HP 56, copolymer of vinyl pyrrolidone and sodium methacrylate sold under the trade name Sokolan VPMA both by BASF AG, Ludwigschaefen, Germany, copolymer of vinyl pyrrolidone and alkylamino substituted methacrylate or styrene or acrylic acid, vinyl caprolactam, vinyl acetate, all sold by International Specialty Polymers of Wyane, N.J.

Another preferred mixture of polyamines is a combination wherein from about 25 to 100% of the polyamines are homopolymers, copolymers, and terpolymers of the monomer unit:

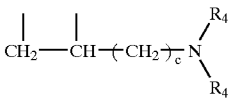

wherein, c is 0 or 1; and $R_4$ is selected from the group consisting of H, $C_1$–$C_4$ alkyl, hydroxyalkyl, and mixtures thereof. Copolymerized wth a monomer unit selected from the group consisting of vinyl pyrrolidone, vinyl pyridine-N oxide, acrylic acid, $C_1$–$C_{16}$ alkyl acrylate, methacrylic acid, $C_1$–$C_{16}$ alkylmethacrylate, $C_1$–$C_8$ hydroxyalkylacrylate, $C_1$–$C_8$ hydroxyalkylmethacrylate, acrylamide, $C_1$–$C_{16}$ alkyl acrylamide, $C_1$–$C_{16}$ dialkylacrylamide, methacrylamide, $C_1$–$C_{16}$ alkylmethacrylamide, $C_1$–$C_{16}$ dialkylmethacrylamide, 2-acrylamido-2-methylpropane sulfonic acid, 2-acrylamido-2-methylpropane alkali salt, vinyl formamide, vinylacetamide, vinyl alcohol, $C_1$–$C_8$ vinylalkylether, itaconic acetate, vinyl propionate, vinyl butyrate, and mixtures thereof.

Other polyamines preferred for post-polymerization cross-linking include reactive wet-strength resins described by Kenneth W. Britt in *Wet Strength in Pulp and Paper Chemistry and Chemical Technology*, Vol. III, ed. James Case, John Wiley, 1981, and L. L. Chan in *Wet Strength Resins and their Application*, Tappi Press, 1994. Preferred wet strength polyamidoamine-polyamine epichlorohydrin resins have a molecular weight range from about 300 to about 1,000,000. The amine or amine-epichlorohydrin resins may have one or more functional groups capable of forming azetidinium groups. Furthermore, they may also contain one or more functional epoxide groups. Examples of such resins include those sold under the trade names Kymene® 557H, Kymene® 557LX, Kymene® 450, Kymene® 2064 (Hercules, Inc. Wilmington, Del.), and Luresin® KNU (BASF AG, Germany), mixtures thereof, and quaternized condensates of a polyamine and a cross-linking agent.

The Dye Transfer Inhibitor

An optional, but preferred ingredient in the current invention is a dye transfer inhibitor in addition to the dye absorber. Dye transfer inhibitors are generally well known in the art, and any known are suitable for use with the present invention. Generally dye absorbers are soluble materials; according to the present invention, the dye transfer inhibitor would be releasable associated with the insoluble substrate. Dye transfer inhibitors would be introduced to the wash solution via the insoluble substrate, solubilize or otherwise dissociate from the insoluble substrate, and flow freely throughout the wash solution. Dye transfer inhibitors interact with fugitive dyes by binding or oxidizing them, and prevent redeposition of fugitive dyes on articles and/or garments. The dye transfer inhibitor is not an essential component of the current invention, but is desirable, to ensure thorough capture of fugitive dyes in a wash solution. The dye transfer inhibitor may, but does not necessarily have to be comprised of the same material as the dye absorber.

Many different materials can be used as dye transfer inhibitors, including, but not limited to polymers; enzymes; bleaches, alone or with bleaching aids and/or bleaching activators; inclusion compounds; minerals; nonionic and conventional aqueous thickeners; systems comprising combinations of those listed, and combinations thereof.

Some examples of polymers that have been used as dye transfer inhibitors include: homopolymers, copolymers and terpolymers of vinyl pyrrolidone, vinyl imidazole for example those described in U.S. Pat. No. 5,627,151, polyamine-N-oxides, homopolymers, copolymers and terpolymers of polyvinyl pyridine and its derivatives, especially quaternized polyvinyl pyridine carboxylate described in WO 99/15614 and WO 00/35880, acrylamide containing polymers, aqueous thickeners, aryl sulfonic acid condensates, as for example those described in EP 634,486, vinyl amide polymers such as those described in EP 753, 566, polymers containing =N—C(=O) group described in WO 98/49259; dendritic macromolecules such as those described in EP 779,358; cationic starches; copolymers of cationic starches; hydrophobicly modified PVP; polyethylene imines and its derivatives such as those described in WO 97/42286; polyvinyl oxazolidone; propylene oxide reaction products; poly(amino acids), specifically, polyaspartic acid and polyhistadine; block copolymers of alkylene oxides, for example, those of the trade name Pluronic® (BASF); polyamines, polyamides, methyl cellulose, carboxyalkyl cellulose; guar gum; natural gums; polycarboxylic acids; alginic acid; copolymers of proteins; copolymers of hydrolyzed proteins; colloids; hydrophobicly derivatized cellulose derived colloids; polymer coated colloids; and poly-4-vinylpyridine-N-oxide, quaternized polyvinyl pyridine carboxylate for example sold under the trade name Chromabond (International Specilty Products), condensates of polyamine and cyano or guanidine containing compound as described in U.S. Pat. No. 6,008,316.

Bleaches have also been used as dye transfer inhibitors. Some examples of bleaches and bleaching systems useful as dye transfer inhibitors include: halogen bleaching agents; organic peroxy acids, such as percarboxylic acid; perborates; persulfates; percarbonates; peroxydisulfates; perphosphates; $H_2O_2$ generating enzymes; $H_2O_2$ generating systems, such as a combination of a metallo bleach catalyst, an amine base catalyst stabilizer, and an enzyme; as well as other known bleaching agents.

Enzymes and enzyme systems have also been employed as dye transfer inhibitors. Some non-limiting examples of enzymes and enzyme systems include: enzyme oxidants; catechol oxidase; laccase; systems comprising an enzyme which exhibits peroxidase activity, an $H_2O_2$ source, and an accelerator such as phenothiazine or phenoxazine; systems comprising a metallo bleach catalyst, an amine base catalyst stabilizer, and an enzyme capable of generating $H_2O_2$; and enzymatic systems including peroxidases and oxidases.

Other materials that have are useful dye transfer inhibitors also include cationic and amphoteric surfactants; cyclodextrins and other inclusion compounds; minerals, such as magnesium aluminate and hydrotalcite; bleaching activators, such as tetraacetylethylenediamine; nonanoyloxybenzenesulfonate, 3,3,5-trimethylhexanoyloxybenzenesulfonate, pentaacetylglucose, and acylated citrate esters; and nonionic and conventional thickeners, such as polyethoxylated urethanes, and acrylamide containing polymers.

This list is not intended to be all-inclusive of dye transfer inhibitors that may be used, and is not meant to limit the invention. The dye transfer inhibitor used as part of the current invention may comprise any single dye transfer inhibitor or any combination of two or more dye transfer inhibitors. The amount of dye transfer used per laundry additive article will depend on the scavenging efficiency of the chosen material. One of ordinary skill in the art would be able to select an effective amount based on the identity of the dye transfer absorber chosen. The amount of dye transfer inhibitor is generally expected to fall within the range of about 0.01 g to about 5 g per laundry additive article.

The Substrate

The insoluble substrate is the vehicle by which the dye absorber and any other optional components, including the dye transfer inhibitor are introduced into the wash solution. As described above, the preferred method of adhering the dye absorber physically to the substrate is by cross-linking the dye absorber to form a three-dimensional network around the substrate web. Unlike dye absorbing systems using cationics, the current invention does not require that the substrate have any specific chemical functionalities. Substrates with no reactive functional groups can be used with the current invention. Furthermore, substrates can be used as made or received without performing any additional steps, such as surface modification.

The substrate may be virtually any material that is insoluble in standard aqueous wash conditions. Several suitable materials are known in the art. A non-limiting list of these materials includes cellulosic materials, such as wood pulp, rayon, and cotton, in both woven and non-woven forms; and synthetic polymeric materials such as polyester, polyethylene, polypropylene, and polyurethane.

The most preferred substrate for this invention is tissue paper, with a weight of about 40 grams per square meter (gsm), made with northern softwood Kraft pulp. The second most preferred substrate is approximately 60 gsm hydroentangled wet laid nonwoven, sold under the trade name Hydraspun® (Dexter Corp., Windsor Locks, Conn.). The third most preferred substrate is approximately 100 gsm air-laid nonwoven substrate material comprised of 72% wood pulp, 25% bicomponent fibers, and 3% latex, sold under the trade name Visorb (Buckeye Technologies, Memphis, Tenn.).

The substrate can be any color, though a lighter color is preferred so that dyes and dirt collected by the dye absorber during the wash cycle can be seen by the consumer. The substrate comprises one layer or multiple layers made of combinations of materials with the desired properties. The substrate may be water permeable to let the wash solution pass through to enhance absorption of fugitive dyes by the dye absorber.

Since almost any water-insoluble material may be used as the substrate, some further considerations may include durability, handfeel, processability, and cost. Other desirable characteristics may also include that the substrate preferably will not lint, fall apart, or ball up. Furthermore, the substrate should be heat resistant up to temperatures employed in typical wash conditions in the US and Europe, and should be able to stand up to drying in a conventional clothes dryer without any ill effects.

The Signal

Optionally, a signal may be incorporated into the laundry additive article of the current invention. The signal would offer visual evidence to the consumer that there were extraneous dyes released into the wash solution and that those extraneous dyes were absorbed by the article. The color change of the signal may be a result of any of several different mechanisms, including but not limited to, absorption or adsorption of dyes and dirt, binding with, or otherwise tying up dyes and dirt on the article.

In a preferred form, the article will have some areas that do not have dye absorber. In these areas with no dye absorber, the color of the article will remain unchanged through the wash cycle, while the areas with dye absorber will change as dyes and dirt are absorbed. This will provide a greater contrast for the signal than if the entire area is covered with dye absorber.

Optional Ingredients

While the central feature of the current invention is to provide a laundry additive article that selectively and effective absorbs fugitive dyes from solution and further prevents those dyes from redepositing onto other fabrics in a wash solution, the wash additive article of the current invention may also comprise a number of other optional ingredients. These ingredients may add any desirable quality to the article, including, but not limited to enhancing wash properties, providing fabric softening, and serving aesthetic purposes.

A non-limiting list of optional ingredients includes detergents; detergent adjuncts; anionic, cationic, nonionic, zwitterionic, and amphoteric surfactants; soil release agents, including, but not limited to copolymers or terpolymers of terephthalic acid with ethylene and/or propylene glycol; soil suspension agents; chelants; bactericides; tarnish inhibitors; suds suppressers; and anti-redeposition agents. Other desirable optional additives may include optical brighteners; coloring agents; dyes; and pigments. Fabric softeners may also be added. These may be chosen from any known in the art, including, but not limited to inorganic types, including smectite clays, montmorillonite clays, and hectorite clays; and organic types, such as water insoluble tertiary amines, water insoluble tertiary amines combined with monoquaternary ammonium salts, and water insoluble tertiary amines combined with di-long-chain amides. Perfumes may be added as well.

Method of Use

The laundry additive article of the current invention is meant to be used as part of a regular laundering routine. The article is added to a home or commercial washing machine along with the detergent, clothes and other fabric items to be washed, and any other additives, such as fabric softeners, which may be added. During the wash cycle, the article will release the dye transfer inhibitor into the wash solution, if included, and retain the insoluble polyamine dye absorber. The article will move freely around the wash solution, coming into contact with fugitive dyes, absorbing them, and retaining them on the article permanently. The article will also be able to capture any dyes released during the rinse cycle, after a dye transfer inhibitor would be rinsed away. Upon completion of the entire wash cycle, the article may be removed and disposed of, or may be placed in the clothes dryer with the other fabrics from the washing machine.

The efficient, selective dye-absorbing article of the present invention has several advantages over the prior art. The unique dye absorbing system that it employs is selective to dyes, unlike the dye absorbers of the prior art. The cationic dye absorbers of the prior art did adsorb some fugitive dyes, but absorbed even more anionic surfactant from the detergent. The result was lower detergent efficiency and lower dye absorber efficiency. Furthermore, cationic dye absorbers could not be made completely insoluble. Any soluble cationic dye absorber would bind to fabrics, adsorb fugitive dyes and fix them permanently to the fabrics. With the current invention, slight insolubility is not a problem because the non-cationic dye absorbers used act as dye transfer inhibitors when solubilized. They do not bind to clothes, still bind fugitive dyes, and are rinsed away at the end of the wash cycle.

EXAMPLES

Example 1

A mixture of the following composition was prepared:

| | % by weight |
|---|---|
| Polyvinyl pyrrolidone co-vinyl imidazole[1] | 15.0 |
| Polyamine Epichlorohydrin (PAE) resin[2] | 7.5 |
| Water/Inerts | 77.5 |
| Total | 100.0 |

[1]Sold under the trade name Sokolan ® HP 56 (BASF AG, Germany)
[2]Sold under the trade name Kymene ® 557H (Hercules, Inc., Wilmington, DE)

The solution was padded on a Bounty® Rinse and Reuse® paper substrate (basis weight 19 grams per square meter (gsm), Procter and Gamble) using a Werner Mathis 2 roll Padding Machine, Model HVF. The nip pressure was set at 3 Bar to achieve a pickup of about 100%. The padded substrate was dried and cured in a convection oven at 250° F. for 20 minutes.

Example 2

A mixture of the following composition was prepared:

| | % by weight |
|---|---|
| Polyvinyl pyrrolidone co-vinyl imidazole[1] | 15.0 |
| PAE resin[3] | 7.5 |
| Water/Inerts | 77.5 |
| Total | 100.0 |

[1]Sold under the trade name Sokolan ® HP 56 (BASF AG, Germany)
[3]Sold under the trade name Kymene ® 2064 (Hercules, Inc., Wilmington, DE)

The solution was padded on a Bounty® Rinse and Reuse® paper substrate (basis weight 19 gsm, Procter and Gamble) using a Werner Mathis 2 roll Padding Machine, Model HVF. The nip pressure was set at 3 Bar to achieve a pickup of about 100%. The padded substrate was dried and cured in a convection oven at 250° F. for 20 minutes.

Example 3

A mixture of the following composition was prepared:

| | % by weight |
|---|---|
| Polyvinyl pyrrolidone co-vinyl imidazole[1] | 15.0 |
| PAE resin[4] | 7.5 |
| Water/Inerts | 77.5 |
| Total | 100.0 |

[1]Sold under the trade name Sokolan ® HP 56 (BASF AG, Germany)
[4]Sold under the trade name Luresin ® KNU (BASF AG, Germany)

The solution was padded on a Bounty® Rinse and Reuse® paper substrate (basis weight 19 gsm, Procter and Gamble) using a Werner Mathis 2 roll Padding Machine, Model HVF. The nip pressure was set at 3 Bar to achieve a pickup of about 100%. The padded substrate was dried and cured in a convection oven at 250° F. for 20 minutes.

Example 4

A mixture of the following composition was prepared:

| | % by weight |
|---|---|
| Polyvinyl pyrrolidone co-vinyl imidazole[1] | 15.0 |
| PAE resin[2] | 3.75 |
| Water/Inerts | 81.25 |
| Total | 100.0 |

[1]Sold under the trade name Sokolan ® HP 56 (BASF AG, Germany)
[2]Sold under the trade name Kymene ® 557H (Hercules, Inc., Wilmington DE)

The solution was padded on a Bounty® Rinse and Reuse® paper substrate (basis weight 19 gsm, Procter and Gamble) using a Werner Mathis 2 roll Padding Machine, Model HVF. The nip pressure was set at 3 Bar to achieve a pickup of about 100%. The padded substrate was dried and cured in a convection oven at 250° F. for 20 minutes.

Example 5

Synthesis of 2:1 Bis(Hexamethylene)Triamine:Epichlorohydrin Prepolymer

A 2-L, three neck, round bottom flask was equipped with a magnetic stirring bar, condenser, addition funnel, thermometer, and temperature controller (Therm-O-Watch, $I^2R$). 713.5 g (3.3 mol) of bis(hexamethylene)triamine (Aldrich) and approximately 400 mL of methanol (Baker) were added to the flask; the solution was blanketed with argon and heated to reflux. 153.2 g (1.66 mol) of epichlorohydrin, neat, (Aldrich) was added over approximately 45 minutes. The solution was heated to reflux overnight. A $^{13}C$-NMR (dmso-$d_6$) showed the absence of peaks corresponding to epichlorohydrin at approximately 45 ppm, approximately 46 ppm, and approximately 51 ppm. A new peak appeared at approximately 50 ppm along with many more new peaks in the 54–70 ppm region. The resulting bulk material was divided into four 1-L round bottom flasks and each flask was heated in a Kugelrohr apparatus (Aldrich) at 170° C. and approximately 2 mmHg for 2 hours as methanol and unreacted bis(hexamethylene)triamine distilled from the mixture. After cooling, 719 g of product were recovered as a tan waxy solid. A $^{13}C$-NMR on this thoroughly stripped and heated sample showed peaks at approximately 50 ppm and a simplified 54–70 ppm region with peaks at 54.6, 55, 60, 67.7, and 68.6 ppm, which are consistent with 2-hydroxy-1,3-propylene-linked amines.

Example 6

A mixture of the following composition was prepared:

| | % by weight |
|---|---|
| 2:1 Bis(hexamethylene)triamine:Epichlorohydrin prepolymer[5] | 15.0 |
| PAE resin[1] | 3.75 |
| Trisodium phosphate | to pH = 10 |
| Water/Inerts | to 100% |

[1]Sold under the trade name Kymene ® 557H (Hercules, Inc., Wilmington, DE)
[5]From Example 5

The solution was padded on a Visorb X622 (basis weight 100 gsm, Buckeye Technologies, Memphis, Tenn.) using a Werner Mathis 2 roll Padding Machine, Model HVF. The nip pressure was set so as to achieve a pickup of about 120%. The padded substrate was dried and cured in a convection oven at 250° F. for 20 minutes.

Example 7

A mixture of the following composition was prepared:

| | % by weight |
|---|---|
| 2:1 Bis(hexamethylene)triamine:Epichlorohydrin prepolymer[5] | 15.0 |
| tripropylolpropane triglycidylether | 1.0 |
| Trisodium phosphate | to pH = 10 |
| Water/Inerts | to 100% |

[5]From Example 5

The solution was padded on a Visorb X622 (basis weight 100 g/sqm, Buckeye Technologies, Memphis Tenn.) using a Werner Mathis 2 roll Padding Machine Model HVF. The nip pressure was set so as to achieve a pickup of about 120%.

The padded substrate was dried and cured in a convection oven at 250° F. for 20 minutes.

Example 8

A mixture of the following composition was prepared:

| | % by weight |
|---|---|
| Polyvinyl pyrrolidone co-vinyl imidazole[1] | 15.0 |
| PAE resin[2] | 3.75 |
| Polyvinylpyridine N oxide | 2.5 |
| tripropylolpropane triglycidylether | 1.0 |
| Water/Inerts | to 100% |

[1]Sold under the trade name Sokolan ® HP 56 (BASF AG, Germany)
[2]Sold under the trade name Kymene ® 557H (Hercules, Inc., Wilmington, DE)

The solution was padded on a Visorb X622 (basis weight 100 gsm, Buckeye Technologies, Memphis, Tenn.) using a Werner Mathis 2 roll Padding Machine, Model HVF. The nip pressure was set so as to achieve a pickup of about 120%. The padded substrate was dried and cured in a convection oven at 250° F. for 20 minutes

Example 9

Synthesis of Condensate of Imidazole and Tripropylolpropane Triglycidyl Ether

A 1-L, three neck, round bottom flask was equipped with a magnetic stir bar, a water cooled condenser with argon inlet, a thermometer with temperature controller (Therm-O-Watch, $I^2R$) and an addition funnel. 23.4 g (0.343 mol) of imidazole (Aldrich), 12.5 g (0.343 mol) of concentrated hydrochloric acid (HCl, Baker), and 180 mL of absolute ethanol (AAPER) were added. Under argon blanket, the solution was heated to 50° C., with mixing. A solution of 69.2 g (0.229 mol) of trimethylolpropane triglycidyl (Aldrich) in 90 ml of absolute ethanol (AAPER) was added, dropwise, over approximately 30 minutes. Heating of the solution was continued at 50° C. for 30–40 minutes, the solution was then heated at 80° C. for three hours. Upon cooling, a clear, homogeneous, pale yellow, somewhat viscous solution was obtained. A small sample was concentrated by evaporation of ethanol and diluted with a 50/50 (wt/wt) mixture of methanol-$d_4$/$D_2O$ for NMR analysis. $^{13}C$ and $^{13}C$ DEPT NMR showed the absence of peaks around 43.8 ppm and 50.6 ppm corresponding to the trimethylolpropane triglycidyl ether. The spectrum showed many peaks in the 5–80 ppm region and the 120–140 ppm region which appear consistent with a partially polymerized, partially cross-linked imidazole-triglycidyl ether polymer. This solution was then ready to be applied to a cellulosic substrate and complete polymerization or curing.

Example 10

A mixture of the following composition was prepared:

| | % by weight |
|---|---|
| Condensate of imidazole and tripropylolpropane triglycidyl ether[6] | 15.0 |
| PAE resin[1] | 3.75 |
| Trisodium phosphate | to pH = 10 |
| Water/Inerts | to 100% |

[1]Sold under the trade name Kymene ® 557H (Hercules, Inc., Wilmington, DE)
[6]From Example 9

The solution was padded on a Bounty® Rinse and Reuse® paper substrate (basis weight 19 gsm, Procter and Gamble) using a Werner Mathis 2 roll Padding Machine, Model HVF. The nip pressure was set at 3 Bar to achieve a pickup of about 100%. The padded substrate was dried and cured in a convection oven at 250° F. for 20 minutes.

Example 11

A two-ply web was prepared using a spunbonded non-woven of basis weight 19 gsm per ply. During the lamination process, Amberlite IRA 35 resin was laid between the plies. The density of the resin layer was 40 g/sq meter. The laminate was then cut into pieces of dimensions 15 cm×15 cm. It was then sealed around the edges to produce pockets using a thermally powered bonding equipment.

What is claimed is:

1. A laundry additive article effective for selectively absorbing and inhibiting transfer of extraneous dyes in a wash solution, said article comprising:

a) an insoluble substrate for introduction into a wash solution;

b) a dye absorber comprising a substantially insoluble non-cationic polymeric amine comprising vinyl imidazole fixably adhered to said substrate;

c) optionally, a dye transfer inhibitor releasably associated with said substrate.

2. The laundry additive article of claim 1 wherein said dye absorber is polyvinyl pyrrolidone co-vinyl imidazole.

3. The laundry additive article of claim 2 wherein said dye absorber comprises polyvinyl pyrrolidone co-vinyl imidazole and a polymeric amine-epichlorohydrin resin.

4. A method for preventing transfer of extraneous dyes in a wash solution containing an anionic surfactant comprising the steps:

a) adding to said wash solution a cleaning effective amount of detergent comprising an anionic surfactant;

b) adding to said wash solution a laundry additive article according to claim 1 c) leaving said laundry additive article in contact with said wash solution during an entire laundering cycle; and d) optionally, leaving said laundry additive article with said articles and/or garments when they are placed in a clothes dryer.

* * * * *